E. C. & N. H. SOOY.
THRESHING MACHINE FOR STANDING GRAIN.
APPLICATION FILED FEB. 18, 1913.

1,103,324.

Patented July 14, 1914.
4 SHEETS—SHEET 1.

E. C. & N. H. SOOY.
THRESHING MACHINE FOR STANDING GRAIN.
APPLICATION FILED FEB. 18, 1913.

1,103,324.

Patented July 14, 1914.
4 SHEETS—SHEET 2.

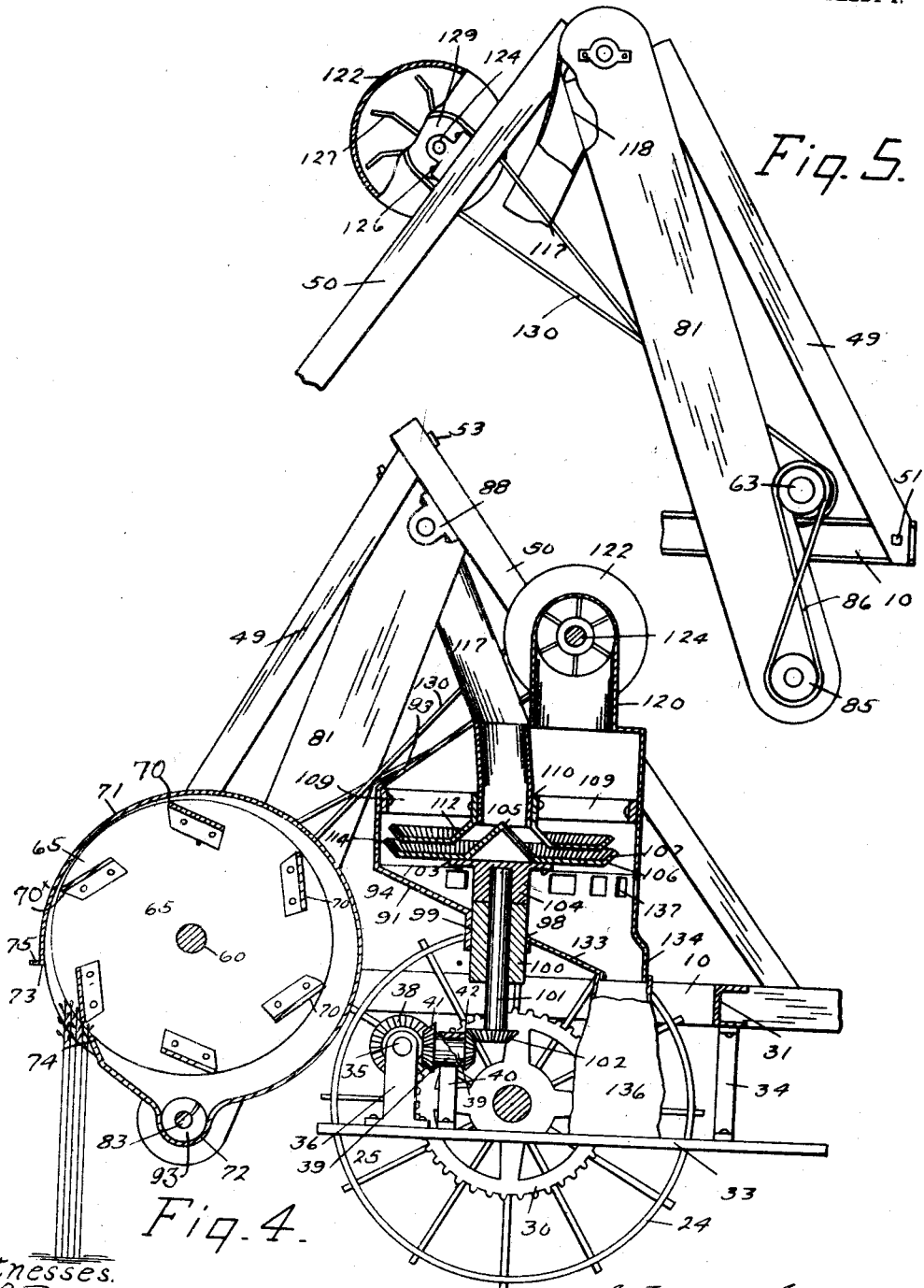

UNITED STATES PATENT OFFICE.

EPHRAIM C. SOOY AND NORMAN H. SOOY, OF KANSAS CITY, MISSOURI.

THRESHING-MACHINE FOR STANDING GRAIN.

1,103,324.    Specification of Letters Patent.    Patented July 14, 1914.

Application filed February 18, 1913. Serial No. 749,195.

*To all whom it may concern:*

Be it known that we, EPHRAIM C. SOOY and NORMAN H. SOOY, citizens of the United States of America, residing at Kansas City, in the county of Jackson and State of Missouri, have invented certain new and useful Improvements in Threshing-Machines for Standing Grain; and we do hereby declare that the following is a full, clear, and exact description of the invention, such as will enable others to make and use the same, reference being had to the accompanying drawings, forming a part of this specification.

Our invention relates to threshing machines which are employed to separate the heads of the grain from the standing stalks, when the machine is advanced toward the grain in the field, and in which the kernels are separated from the heads and then delivered to a sack in successive operations.

The objects of our invention are: First: to remove the heads from the standing grain with the expenditure of less power than hitherto required, and at the same time prevent clogging of the threshing mechanism. Second, to remove the glumes or grain husks from the grain, following the separation of the heads from the stalks; and third, to scour the grain from the heads, so that the removal of the pods are thoroughly accomplished and the grain delivered in a clean condition.

The invention consists in the novel construction and combination of parts, such as will be first fully described, and then specifically pointed out in the claims.

Figure 1:
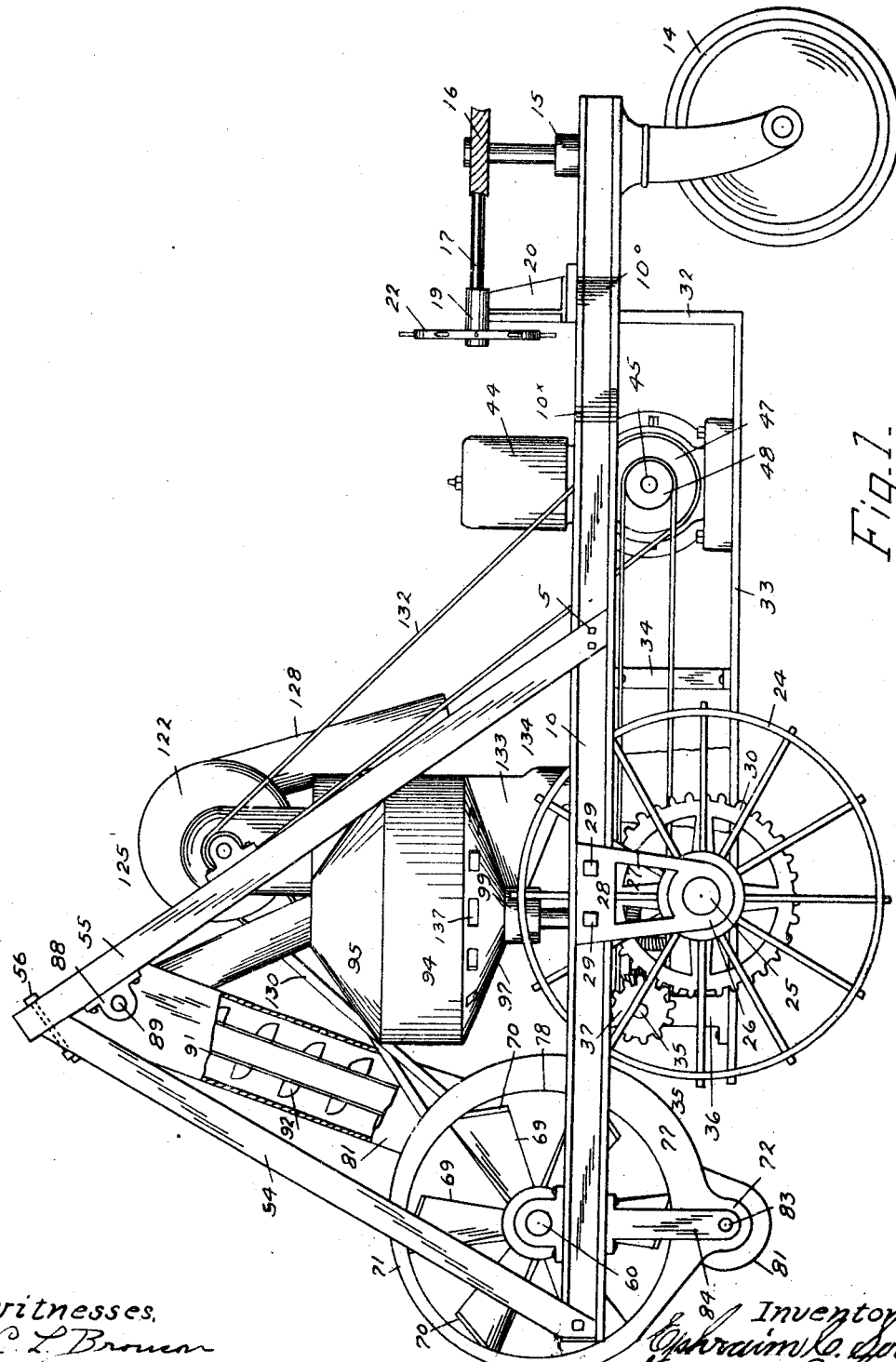
Figure 2:
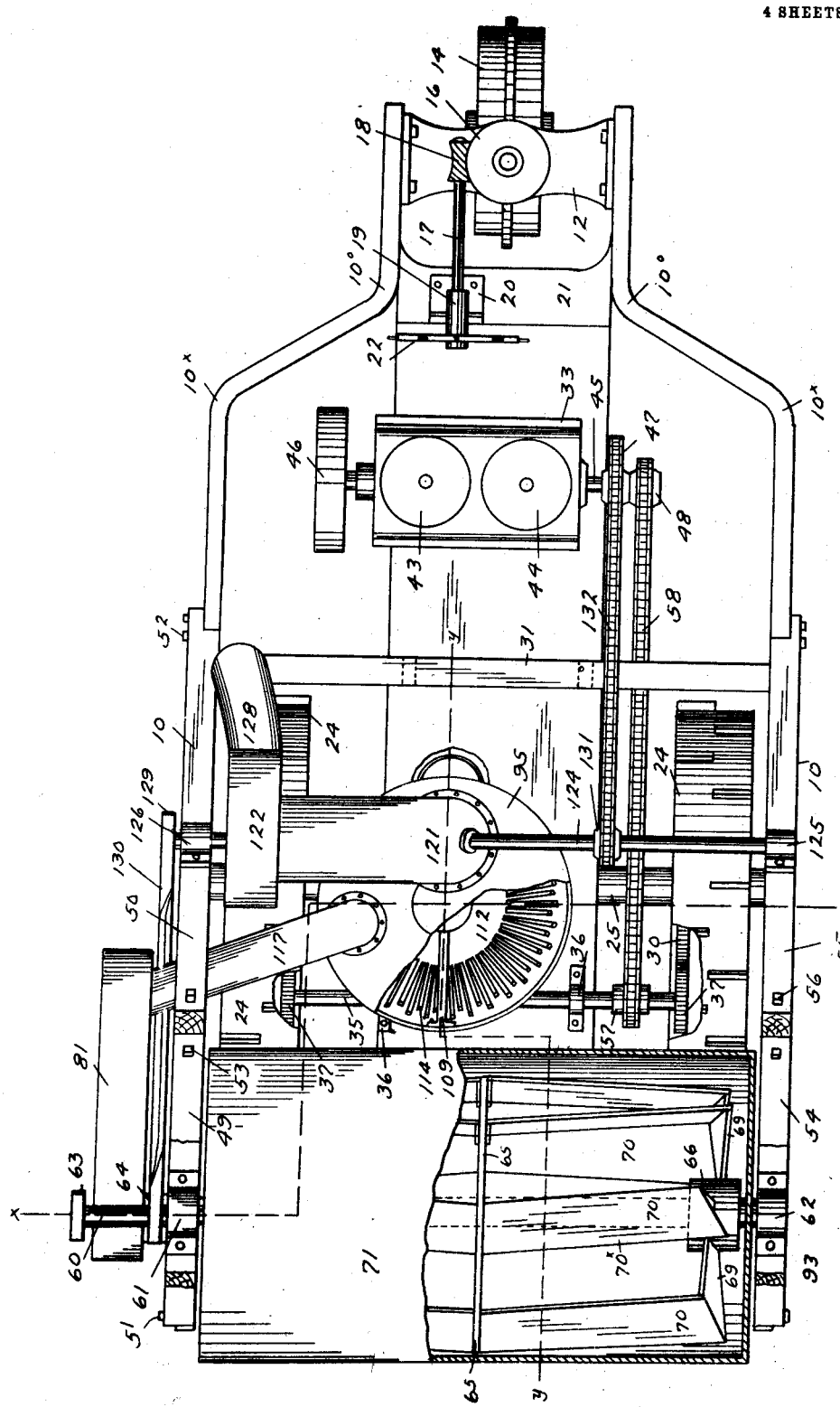
Figure 3:
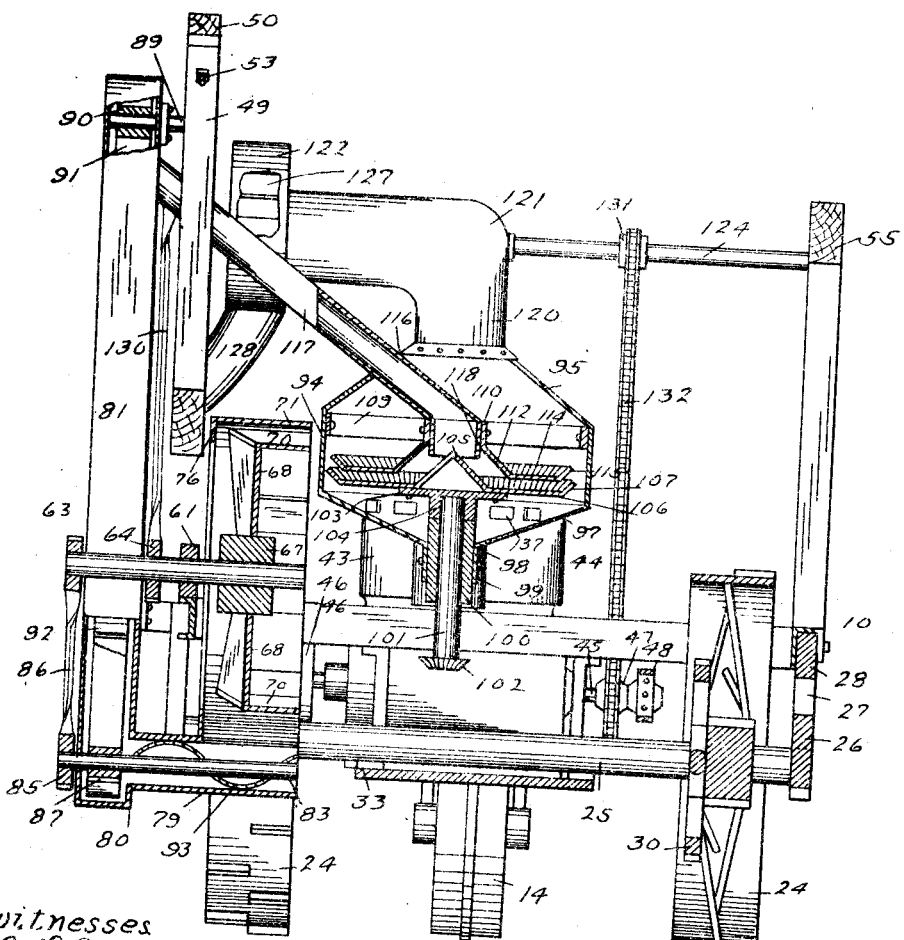

In the drawings: Figure 1. is a side elevation of our improved machine, with the side of the elevator casing broken away, to show the grain elevator. Fig. 2. is a plan view of the machine, a portion of the cylindrical casing for the threshing device being broken away, and also a portion of the top of the casing for the grain-scouring devices. Fig 3. is a transverse, vertical, sectional view of the machine, taken on the line *x, x,* on Fig. 2. Fig. 4 is a vertical, sectional longitudinal view of the main portion of the machine, taken on the line *y, y,* on Fig. 2. Fig. 5. is a detail view, in elevation, of the derrick beams, grain-elevator casing, showing the elbow, a portion of the discharge conduit and suction fan-casing and operative connections, on the left-hand side of the carriage frame.

Similar numerals of reference indicate corresponding parts in all the figures of the drawings.

The various mechanisms for the threshing, elevating and the scouring of the grain, and the motive power is supported upon a carriage, the frame of which is composed of the outer, longitudinally-extended channel beams 10. 10, which are arranged the requisite distance apart, and also parallel with each other. Portions of the rear ends of these beams are bent at 10ˣ, and extended at an angle to the forward portions of the beams inwardly, a short distance, and thence, bent at 10° and extended in parallel lines, and these latter parts connected by means of a transverse beam 12. the ends of which are flanged and bolted to the inner surfaces thereof.

At the rear end of the main frame is a swivel wheel 14. the pivot post 15 extending upwardly through the beam 12, at a point equi-distant from the ends of said beam, the upper portion of the pivot post being reduced in circumference, and upon the upper end thereof is an ordinary worm wheel 16. The rotation of this wheel is effected by means of a horizontal shaft 17, upon the rear end of which is an endless worm 18, engaging with the worm wheel 16. The forward end of the shaft 17 extends through the journal bearing 19. upon the upper end of a standard 20, which standard is secured to the upper surface of a transverse beam 21, secured at its ends to the inner surfaces of the portions of the channel beam immediately in rear of the angles formed in said beams at the points 10°, the upper surface of which beam is horizontal with the upper surfaces of the channel beams 10. Upon the extreme end of shaft 17 and adjacent the outer end of the journal box 19, is a hand or steering wheel 22, whereby the swivel wheel is turned in the desired direction.

The main body of the carriage frame is supported by the traction wheels 24, arranged in position adjacent the inner surfaces of the beams 10 and mounted upon a transverse, rotary shaft or axle 25, the ends of which shaft or axle are journaled in the shaft hangers 26, secured to the outer surfaces of the channel beams 10, at points equi-distant from the angular or bent portion 10ˣ, of sai beams and the forward ends of said beams. ⁿ bars 27, of the hangers 26, are made of considerable length, and connect the journal bearing with the crossbar 28, at the upper ends of the arms, the said bar being bolted to the beams 10, at 29, the lower flange of the channel beams 10 being cut away for the purpose. These hangers elevate the carriage frame to a considerable height above the line of the shaft or axle 25, while preserving the horizontal plane of the carriage frame upon the swivel wheel 14.

Upon the shaft 25, close in position to the inner surfaces of the traction wheels 24, are mounted for rotation with said shaft the large gear wheels 30.

31 indicates a transverse connecting channel beam, which connects the two beams 10, of the carriage frame with each other, the ends of which beam are secured to the inner surfaces of the beams 10 at points forward of the angular, bent portions 10ˣ, of said beams, and approximately intermediate said bent portions and the point of connection of the hangers 26, for the shaft or axle 25 with said beams.

With the lower, forward portion of the transverse beam 21, supporting the steering wheel, is connected the upper end of a vertical supporting plate 32, the lower end of which plate extends downwardly to a position in line horizontally with the lower surface of the shaft or axle 25, and with said end is connected rigidly the rear end of a horizontal platform 33, the forward end of which platform extends forwardly beneath the shaft or axle 25, to a position a considerable distance forward of the line of said shaft, and is supported by the depending bars 34, having bent angle-portions bolted to the lower surface of the transverse beam 31, at their upper ends, and to the upper surface of the platform 33, at their lower ends.

35 indicates an independent, rotary shaft, which extends transversely to the carriage frame, and is located above the forward end-portion of the platform 33, and is supported or journaled in the upper ends of the standards 36, secured to the upper surface of said platform. The ends of shaft 35 extend to a position opposite the gear wheels 30, on the shaft or axle 25, and upon said ends are the spur-gear 37, which mesh with said wheels 30. Upon the shaft 35, intermediate its ends is a bevel gear wheel 38. Extending at right angles to the shaft 35, and in rear thereof, is shaft 39, short in length, and which is journaled in the upper end of the standard 40, which standard is secured to the upper surface of the platform 33, a short distance in rear of the line of the standard 36. Upon one end of shaft 39 is a bevel-gear wheel 41, engaging gear 38, and upon the other end of shaft 39 is a bevel-gear wheel 42, for the purpose further explained.

The motive power for the propulsion of the carriage and the operation of the grain threshing grain elevating and grain scouring mechanisms consist of the duplex motors 43 and 44, which are mounted upon the rear portion of the platform 33, at a point a short distance forward of the support 32, for said platform. The main shaft 45, driven by the motors, extends transversely thereto and the platform 33, the end of the shaft in the direction of the right-hand side of the machine supporting a balance-wheel 46, and upon the end of the shaft, in the direction of the left-hand side of the machine are mounted the sprocket wheels 47 and 48 the former wheel 47 being larger in circumference than the wheel 48.

Upon the right-hand side of the carriage frame are the derrick beams 49 and 50, the lower end of beam 49 being bolted at 51, to the outer surface and forward end of beam 10, and the lower end of beam 50 bolted at 52, to the same side of beam 10, at a point a short distance in rear of the point of connection of the ends of beam 31 with beam 10. The upper ends of beams 49 and 50 are inclined toward each other, the upper end of beam 49 being beveled, and a securing bolt 53 extended diagonally through said ends.

Upon the left-hand side of the machine are the derrick beams 54 and 55, their lower ends being bolted to the outer surface of beam 10, at the rear end and also at a point in rear of the point of connection of beam 31, as described of beam 50, respectively. The upper ends of the beams 54 and 55 extend upwardly the same distance as beams 49 and 50, the upper ends being secured together by the bolt 56.

57 indicates a small band wheel on shaft 35, over which extends a chain 58, which chain also extends to and over the sprocket wheel 48, on the motor shaft 45, whereby the power for moving the carriage is transmitted from the motors 43 and 44, to the shaft 35, and from thence to the gear wheels 30, on shaft 25, and also to the traction wheels 24, on said shaft.

The threshing mechanism consists of a transverse, rotary shaft 60, mounted at its ends in the journal boxes 61 and 62, located upon the upper surfaces of the beams 10, at points a short distance in rear of the forward ends of said beams. The end of the shaft 60, on the right-hand side of the carriage, extends a considerable distance outwardly from the line of the outer surface of beam 10, upon said side of the carriage, and upon said end is a small sprocket wheel 63. Upon shaft 60, a slight distance outwardly from the line of the outer surface of journal box 61, is a small sprocket wheel 64, for the purpose further described. Upon the shaft 60, at a point equi-distant from the end portions within the journal boxes 61 and 62, is secured rigidly a circular, flat partition plate 65. Upon the shaft 60, at points a short distance inwardly from the lines of the inner surfaces of the journal boxes 61 and 62, are mounted fixedly the circular hubs 66 and 67 (see Figs. 2 and 3). From these hubs extend radially the series of arms 68 and 69, respectively. These arms consist of flat plates, or fan-blades, integrally connected with the hubs at their inner ends, and their outer ends turned at oblique angles to the axis of shaft 60, thus forming fan-blades, the position of each blade being such as to throw the air and also the chaff outwardly from the ends of the casing, when the blades meet the air, by impact and in the rotation of shaft 60.

With the upper portions and outer ends of the arms or fan blades 68 and 69 are secured the outer ends of the threshing and beating plates or blades 70. The outer surfaces 70ˣ, of the plates 70 extend from the upper end of one fan blade 68 diagonally to the shaft 60 and to the adjacent surface of the plate 65, and their inner ends are bent at right angles and secured to the respective opposite surfaces of said plate, so as to obtain not only a suction on the air to draw inwardly upon the heads of grain, but a shear blow upon the heads of the grain.

Extending around the revoluble blade 70 is a casing 71. The side plate of casing 71 extends in length nearly the distance between the inner surfaces of the parallel beam 10, of the carriage, and extends in a circular form around the blades and eccentrically to the shaft 60, the casing having a clearance greater in rear of shaft 60, so as to afford a relatively close position of the inner surface of the side of the casing forward of shaft 60, with the outer edges 70ˣ, of the threshing blades 70.

The side plate of casing 71 extends downwardly a considerable distance below the circular lines of the plate, to form a receptacle 72, beneath the casing and in communication therewith. In the forward portion of the side of the casing 71, from a point a short distance below a line extending transversely upon the upper surfaces and forward ends of beams 10, is a transverse opening 73, for the reception of the heads of the grain. This opening extends downwardly to a point in which a contact with the outer edges 70ˣ, of the blades 70, is made with the longitudinal edge 74, of said opening, as seen in Fig. 1, and at the proper distance from the said edge, so as to enable co-action with said edge of the respective blades 70, and remove the grain from the heads, on their presentation to the opening 73. A longitudinal portion of the casing or plate which forms the upper portion of the opening 73, is bent outwardly a short distance, as at 75.

76 and 77 indicate the ends of the casing, the end 76 at the end of the receptacle 72, upon the left-hand side of the carriage, said end having circular openings 78, drawn upon the axial line of shaft 60, and extending radially to the line of the outer ends of the blades 68 and 69. The lower portion of the end 76, of the casing above the receptacle 72, and also the sides of the receptacle 72, are extended outwardly to a point a short distance outwardly from the vertical line of said end, to form an inclosed conduit 79, the outer end of said conduit being connected with the opening 80, in the adjacent side portion and lower end of an elevator casing or box 81.

Within the receptacle 72 is a longitudinal conveyer shaft 83, one end of which shaft extends through the portion of the end-plate 77, to the receptacle 72, and is journaled in the lower end of a shaft hanger 84, secured at its upper end to the lower surface of beam 10, on the left-hand side of the carriage. The other end of shaft 83 extends through the conduit 79 and through the outer side of the elevator casing 81, and a slight distance beyond the line of the outer surface of said casing, and upon said end of the shaft is a sprocket wheel 85. Over the sprocket wheel 85 is extended an endless sprocket chain 86, which is also extended upwardly over the sprocket wheel 63, on the shaft 60.

Upon shaft 83, within the lower end of the elevator casing 81, is a band wheel 87. The upper end of the elevator casing extends upwardly and is inclined rearwardly to a position near the line of the upper surface and end of the derrick beam 55, on the lower surface of which upper end of the beam is bolted a box 88, in which is secured one end of a stud shaft 89, the other end of which shaft extends through the adjacent side and upper end of the conveyer casing 81, and within said casing and upon said end of the shaft is a band wheel 90, loosely mounted on said shaft. Over the band wheel 90 extends a belt 91, the other end of which belt extends over the band wheel 87, on the shaft 83, in the lower end of the conveyer casing. Upon the outer surface of the belt or band 91 are the elevator buckets 92, arranged upon said belt at proper distances apart. Upon the rotary conveyer shaft 83 is a worm blade 93, extending around said shaft and terminating adjacent the opening 80, in the lower end of the casing 81.

The grain-securing mechanism consists of a circular case 94 the top 95 being cone-shaped and extending upwardly from the case 94. The case 94 is positioned a considerable distance above the shaft or axle 25, and in rear of the upper portion of the casing 71, for the threshing mechanism. The bottom 97, of the case 94, is also cone-shaped and is provided with a circular opening 98 and extending downwardly from the sides of said opening is a collar 99, within which collar and the opening 98 is secured rigidly a vertical shaft bearing 100, in which is journaled a rotary shaft 101, upon the lower end of which shaft is a bevel-gear wheel 102, which is in mesh with the bevel gear wheel 42, on the shaft 39, on the standard 40, on platform 33.

Upon the upper end of shaft 101, within the case 94, is fixedly connected a cap plate 103, upon the lower surface of which plate is a socket 104, which receives the upper end of shaft 101, and rotates upon the bearing 98. To the upper surface of the cap plate 103 is secured the cone-shaped plate 105, with the lower edge portion of which plate is integrally connected the inner ends of the riddle bars 106, which radiate outwardly and are spaced a short distance apart from each other, the outer ends of said bars being bent upwardly at 107.

A spider 109 is connected with the inner surface and upper portion of case 94, with the inner ends of which spider are connected a collar 110, from the lower edge of which collar extends downwardly an outwardly-flaring circular plate 112, from the lower edge portion of which plate extend radially the riddle bars 114, which bars are located a short distance above the riddle bars 106, the outer ends being bent upwardly and inclined outwardly at 115, corresponding to the upwardly-bent portions 107, of the riddle bars 106.

In the cone-shaped top plate 95, of the case 94, at an angle to the collar 110, supporting the riddle bars 114, is an opening 116, through which extends the inner end of a grain-conducting spout 117, the extreme inner end of the spout 118 being bent at an angle to the spout and inserted within the collar 110, supporting the riddles 114. The outer end of the spout 117 extends to a position beneath the lower surface and upper end of the conveyer case 81, and is provided with an elbow 118, which connects said spout with said conveyer case at a point a short distance below the line of the band wheel 90.

With the top plate 95, of the case 94, at a point in rear of a vertical line passing through the case 94 and shaft 101 is connected the inner end of an air suction pipe 120, which extends upwardly a short distance and is bent at 121, at right angles and extended in the direction of the upper end-portions of the derrick beams 49 and 50, and upon the end of said pipe is a suction fan case 122.

124 indicates a power shaft, which is journaled at one end in the journal box 125, on the upper end-portion of the derrick beam 55, the other end of which shaft extends through the angular portion 121, of the suction pipe 120, thence through the fan case 122, and is journaled at said end in the journal box 126, on the outer surface and upper end portion of the derrick beam 50. Upon the shaft 124, within the fan case is a suction fan 127. With the lower portion of the fan case is connected a discharge spout 128, for the chaff.

Upon the outer end of the shaft 124, which extends past the journal box 126, is a sprocket wheel 129, over which passes an endless sprocket chain 130, which extends downwardly over the sprocket wheel 64, on the rotary shaft 60. Upon the rotary shaft 124 is sprocket wheel 131, over which extends an endless gearing chain 132, which also extends over the sprocket wheel 47, on the main driving shaft 45, of the motors 43 and 44. The lower or bottom plate 97, of the case 94, is provided with a discharge spout 133, as seen in Figs. 1 and 4, the lower end of the spout being contracted in width, to form a neck 134, beneath which neck is placed on platform 33, a grain-sack 136, for receiving the cleaned grain.

In the bottom plate 97, of the case 94, beneath the line of the lower riddle bars 106, and in the side of said plate 97 toward the right-hand side of the carriage, are a series of openings 137, for the admission of air and which is drawn upwardly through the case by the suction fan 127.

In operation the machine is arranged in the field with the opening 73, in the case 71, inclosing the threshing plates 70, in the direction of the heads of the standing grain. Power from the motors 43 and 44 is communicated to the motor-driven shaft 45, thence to the shaft or axle 33, upon which the traction wheels 24 are mounted, and the machine is advanced in the field at the proper degrees of speed, the direction of movement being maintained, or a change in direction quickly accomplished in the operation of the band wheel 22, and the movement of the swivel wheel 14 controlled thereby. Simultaneously with the advanced movement communicated to the carriage, power is transmitted from the large band wheel 47, through the endless band 132, to the band pulley 131, on shaft 124, operating the suction fan 127, this power also being transmitted from the band wheel 129, on the end of said shaft to the endless band 130, thence to the band wheel 64, on the shaft 60, in the threshing case 71, and carrying the threshing plates 70, thence from the band wheel 63, on end of said shaft, to the endless sprocket chain 86, thence to the sprocket wheel 85, on shaft 83, carrying the conveyer worm 93, and also communicating rotary motion to the band wheel 87, actuating the conveyer belt 91, carrying the elevator buckets 92, the movement of said mechanism being slightly accelerated over that communicated from the motor to the shaft 35. This slower movement communicated to shaft 35 is transmitted through the bevel gear 38, on said shaft to shaft 39, on standard 40, through the bevel gear 41, and from bevel gear 42, on shaft 39, to the bevel gear 102, on the shaft 101, operating the movable riddle bars 106.

The heads of grain are drawn within the opening 73, by the combined suction of the fan blades 68 and 69, the rotary action of the bars 70 on the air and in the path of the said bars 70, and the heads are sucked inwardly within the casing 71, and downwardly upon the lower edge 74, of the opening 73, the bars 70 beating the grain from the heads by a shear movement, and the chaff is blown out of the case by the combined outward blast action of the fan blades 68 and 69, and the header bars 70. The grain falls into the receptacle 72, and the worm 93 in the rotation of shaft 83 carry the grain to end of the elevator casing 81, the buckets scooping the grain therein and delivering said grain to the conveying spout 117, from which the grain falls on the cone-shaped plate 105, through the riddle bars into the bag 186. Should any heads containing grain be cut off by the beater bars, they will be carried along with the grain and dumped as before, into the spout, and thence into the scourer case upon the riddle bars, and in the centrifugal movement of the riddle bars 106 and between said bars and the upper riddle bars the grain heads are rubbed and scoured, releasing the grain from the pods, and the grain falls through the riddle bars upon the bottom plate 97, of the case 94, thence through the chute 133 to the grain bag 186, upon the platform 33. At the same time, the suction fan 127 draws the air through the openings 137, in the bottom plate 97, of the case 94, through the riddle bars 106, 114, which pass upwardly in the suction pipe 120, through the fan case, and are discharged through the pipe 128, to the ground. The division of the thresher casing into separate chambers, which follows in the employment of partition plate 65, divides the air suction so that the air will be forced in opposite directions; also, enables the action of the beater blades to act uniformly upon the quantity of grain presented, without reaction upon the power transmitted from shaft 33.

The invention is applicable to the threshing and scouring of various kinds of grain, especially wheat, and which is superior to the ordinary header, my invention delivering its grain in a commercially clean condition.

Various changes in the construction of the parts of the machine may be made, and such modifications employed as are within the scope of the appended claims.

Having fully described our invention, what we now claim as new and desire to secure by Letters Patent is:

1. In a grain thresher for standing grain, a case having an opening in its side to receive the heads of standing grain, and discharge openings in the ends of said casing, and combined rotary grain-threshing and air suction and blasting devices co-acting to draw the heads of grain within the side of the casing and blast the chaff through the openings in the ends of the casing.

2. In a grain thresher, the combination with a rotary shaft and the grain threshers, of radial air suction and blast fan blades on said shaft supporting said threshers and arranged at an angle to the longitudinal axis of the shaft.

3. In a grain thresher, the combination with a rotary shaft, of outwardly-curved grain threshing plates, and radial air-blasting blades upon said shaft supporting said plates and inclined at an angle to the longitudinal axis of the shaft.

4. In a grain thresher, the combination with a casing having an opening in its side to receive the heads of the grain, and openings in the end or ends for the discharge of the chaff, of a rotary shaft within said case, radial fan blades on said shaft inclined at an angle to the longitudinal axis thereof, and beater bars on said blades movable past the lower edge of said opening in the side of the case and at an angle thereto.

EPHRAIM C. SOOY.
NORMAN H. SOOY.

Witnesses:
ROBERT O. McLIN,
ANNIE L. GREER.